United States Patent [19]
Ludwig et al.

[11] 3,834,580
[45] Sept. 10, 1974

[54] SAFETY PRESSURE RELIEF DEVICE

[75] Inventors: Gary Joe Ludwig; Loren E. Wood, both of Tulsa, Okla.

[73] Assignee: Black, Sivalls & Bryson, Inc., Tulsa, Okla.

[22] Filed: Sept. 25, 1972

[21] Appl. No.: 291,951

[52] U.S. Cl................................. 220/89 A, 137/68
[51] Int. Cl................................................ F16k 17/16
[58] Field of Search............................... 220/89 A; 137/68–71

[56] References Cited
UNITED STATES PATENTS

| | | | |
|---|---|---|---|
| 3,005,573 | 10/1961 | Dawson et al. | 220/89 A |
| 3,257,026 | 6/1966 | Taylor | 220/89 A |
| 3,484,817 | 12/1969 | Wood | 220/89 A |
| 3,526,336 | 9/1970 | Wood | 220/89 A |

Primary Examiner—William R. Cline
Assistant Examiner—Richard Gerard
Attorney, Agent, or Firm—Dunlap, Laney, Hessin, Dougherty & Codding

[57] ABSTRACT

The present invention relates to an improved safety pressure relief device of the type having a concave-convex reverse buckling rupture disk supported between inlet and outlet supporting members. By the present invention the rupture disk includes scores on a surface of the concave-convex portion thereof creating lines of weakness therein, and an area of relative weakness is positioned at the center of the concave-convex portion so that upon failure the disk reverses itself from the center of the concave-convex portion outwardly towards the periphery thereof and then tears along the lines of weakness.

9 Claims, 4 Drawing Figures

SAFETY PRESSURE RELIEF DEVICE

BACKGROUND OF THE INVENTION

1. Field of the Invention

The present invention relates generally to safety pressure relief devices which include rupture disks of the reverse buckling type, and more particularly, but not by way of limitation, to an improved safety pressure relief device which employs a reverse buckling rupture disk having scores on a surface thereof creating lines of weakness therein.

2. Description of the Prior Art

Many various safety pressure relief devices of the rupturable type have been developed and used successfully. Generally, these devices are connected to a vessel or system containing fluids under pressure so that a rupture member or disk is exposed to the fluid pressure. If an over-pressure condition is reached within the vessel or system, i.e., a pressure exceeding the design rupture pressure of the disk, the disk ruptures thereby providing pressure relief to the vessel or system.

Recently, rupture devices of the reverse buckling type have been developed which are capable of containing fluid pressures at 90 percent or more of the design rupture pressure for long periods of time. Such a reverse buckling rupture device includes a rupture disk having a concave-convex portion, the convex side of which is exposed to fluid pressure so that the disk is in a state of compression. When the pressure exerted on the disk reaches a level exceeding the rated rupture pressure, the disk reverses itself and then ruptures. In order to bring about rupture of the disk in a manner such that full opening is achieved without fragmentation, knife blades have heretofore been used positioned with respect to the rupture disk so that upon reversal the rupture disk is cut open by the knife blades. Also in lieu of knife blades, scores have been included on a surface of the concave-convex portion of the rupture disk so that lines of weakness are created therein. Upon reaching rupture pressure, such a disk reverses itself and then tears along the lines of weakness created by the scores to achieve full opening without fragmentation.

While safety pressure relief devices which utilize scored reverse buckling rupture disks have been used successfully in higher pressure applications, problems have been encountered in the use of such devices in low pressure applications. Specifically, when the design rupture pressure of the disk is reached the disk reverses itself but full opening of the disk is often not achieved. By the present invention an improved safety pressure relief device utilizing a scored reverse buckling rupture disk is provided wherein problems associated with the failure to open or only partial opening after reversal are obviated.

SUMMARY OF THE INVENTION

The present invention relates to an improved safety pressure relief device having a concave-convex reverse buckling disk supported between inlet and outlet supporting members. The disk includes scores on a surface of the concave-convex portion creating lines of weakness therein so that upon failure the concave-convex portion reverses itself and then tears along the lines of weakness. An area of relative weakness is provided positioned at the center of the concave-convex portion so that the compressive strength at the center of the concave-convex portion is less than the compressive strength of the remainder of the disk. Upon failure, the disk reverses itself from the center of the concave-convex portion outwardly towards the periphery thereof.

It is, therefore, a general object of the present invention to provide an improved safety pressure relief device.

A further object of the present invention is the provision of an improved safety pressure relief device which utilizes a scored reverse buckling rupture disk and which upon failure in low pressure applications achieves full opening.

Still a further object of the present invention is the provision of an improved safety pressure relief device of the type including a scored reverse buckling rupture disk wherein if reversal of the disk occurs without rupture, penetration of the disk is insured.

Other and further objects, features and advantages of the present invention will be readily apparent from the following description of presently preferred embodiments of the invention given for the purpose of disclosure and taken in conjunction with the accompanying drawings.

DESCRIPTION OF THE PREFERRED EMBODIMENTS

Figure 1:
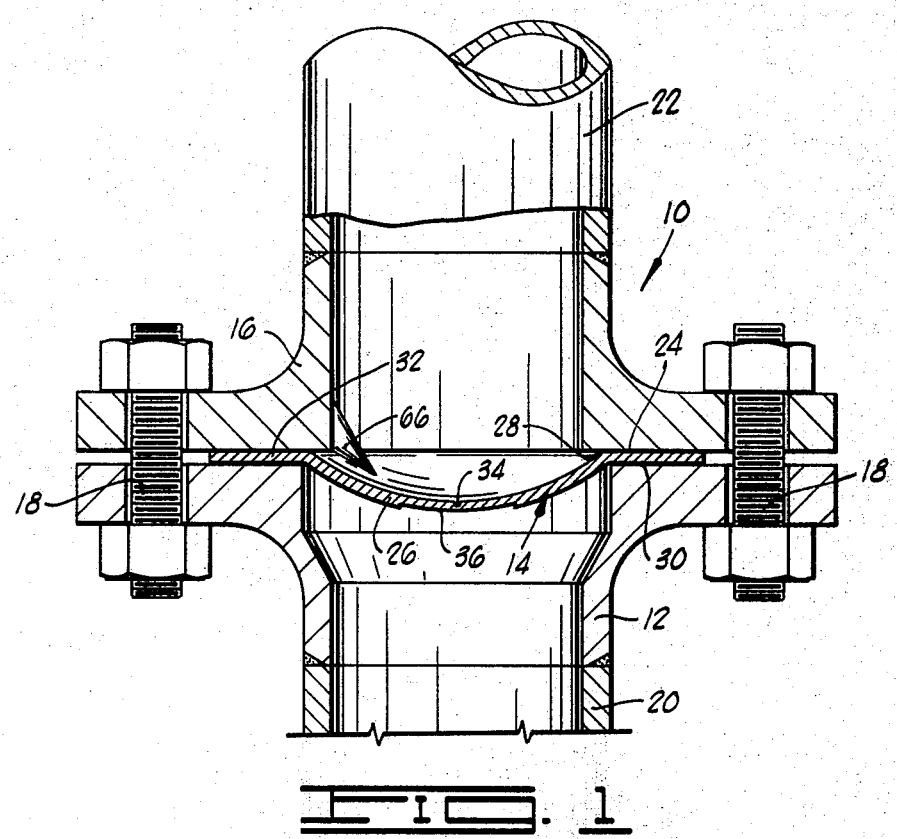
FIG. 1 is an elevational view of a safety pressure relief device of the present invention in cross section.
Figure 2:
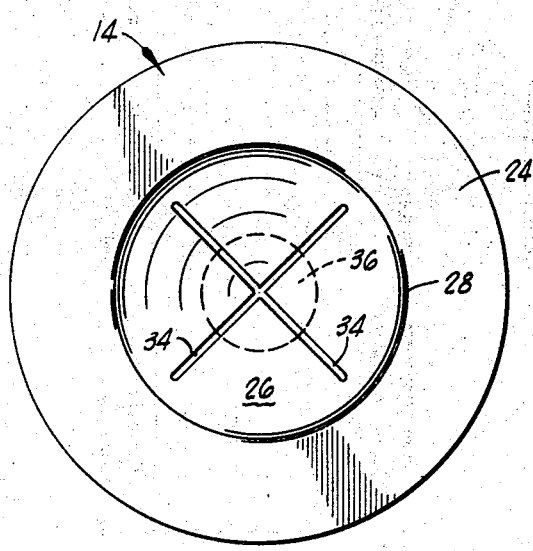
FIG. 2 is a top plan view of the reverse buckling rupture disk of FIG. 1.
Figure 3:
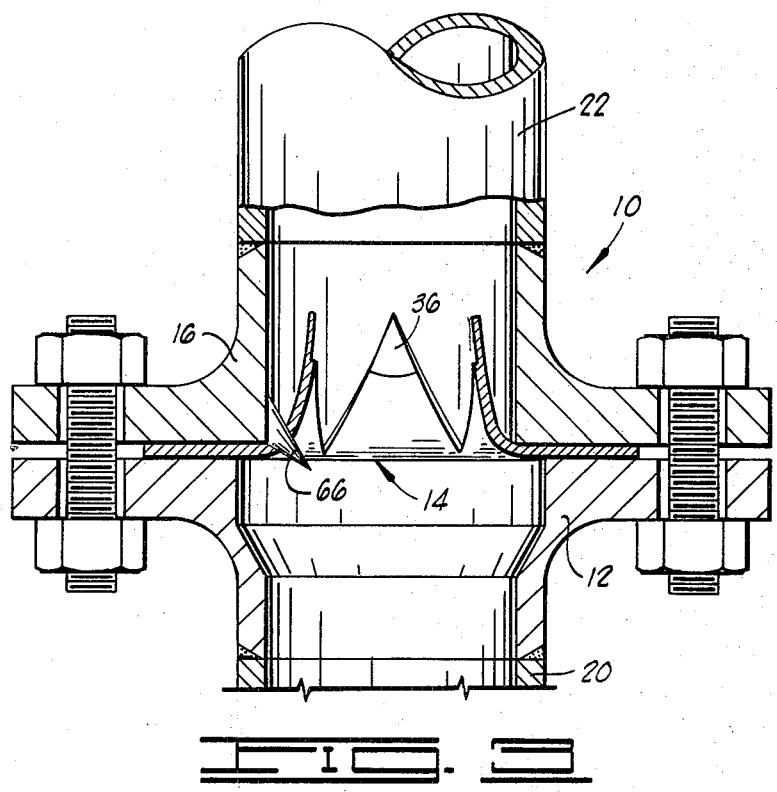
FIG. 3 is an elevational view of the safety pressure relief device of FIG. 1 after rupture has occurred in cross section.

Referring now to the drawings, and particularly to FIGS. 1 through 3, the improved safety pressure relief device of the present invention is illustrated and generally designated by the numeral 10. The device 10 basically comprises an inlet supporting member 12, a reverse buckling scored rupture disk 14 and an outlet supporting member 16. Supporting members 12 and 16 may be formed to include necks suitable for welding similar to pipe flanges and may be clamped together in a conventional manner, such as by a plurality of studs 18. The inlet supporting member 12 is welded to an inlet pipe 20 and the outlet supporting member 16 is welded to an outlet pipe 22. The pipe 20 is connected to a vessel or system containing fluid under pressure so that the pressure is communicated by way of the inlet supporting member 12 to the rupture disk 14. The pipe 22 connected to the outlet supporting member 16 conducts fluids relieved through the device 10 to a vent or other relief area.

As is well understood by those skilled in the art, the inlet and outlet supporting members 12 and 16 may take a variety of forms. For example, instead of being adapted for welding to pipe, the supporting members may contain threads for receiving threaded pipe, or they may be constructed for insertion between a pair of conventional pipe flanges. Regardless of the particular form of the supporting members, they are clamped together to secure the rupture disk 14 therebetween and prevent fluid under pressure communicated to the rupture disk by way of the inlet supporting member 12 from escaping so long as the rupture disk remains intact.

The rupture disk 14 is formed of sheet material of substantially uniform thickness and preferably consists of an annular flat flange portion 24 connected to a concave-convex portion 26 by a transition connection 28. Each of the inlet and outlet supporting members 12 and 16 include annular flat flange portions 30 and 32 respectively, for coacting and supporting the annular flat flange portion 24 of the disk 14.

The convex side of the disk 14 is positioned facing the inlet supporting member 12 so that the fluid pressure exerted on the disk 14 causes it to be in a state of compression. The disk 14 is self-supporting under normal operating pressures, but when fluid pressures exerted on the convex side thereof exceed the design rupture pressure, the disk 14 reverses itself and ruptures.

One or more scores 34 are formed on a surface of the concave-convex portion 26 of the disk 14 creating lines of weakness therein. The scores 34 are formed in the concave-convex portion 26 so that they intersect at the center and extend to near the periphery thereof. Two scores 34 are preferably used to divide the concave-convex portion 26 into quadrants. However, the scores 34 may divide the concave-convex portion 26 into any desired number of sections, and need not necessarily intersect at the center. Further, a single score defining circular or other shaped areas in the portion 26 may be utilized.

Reverse buckling scored rupture disks of the type described above are well suited for use in higher pressure applications. However, difficulties have been encountered in low pressure applications with such rupture disks reversing themselves but not rupturing, or if rupture does not occur full opening is not achieved. It has been found that reversal without rupture or only partial rupture is often caused by the reversal process starting at a side of the disk. That is, the disk reverses itself from one side to another and the concentration of forces after reversal are off center. When this happens, the focus of tensile forces exerted on the concave-convex portion of the disk at the end of the reversal process are off center and rupture either does not occur or only partial opening results.

By the present invention a side failure mode is prevented by the provision of an area of relative weakness at the center of the concave-convex portion 26 of the disk 14 which causes the compressive strength of the disk 14 at the center to be less than the compressive strength of other portions of the disk 14. Referring still to FIGS. 1 through 3, a presently preferred embodiment of this invention is illustrated. In this embodiment, an area of relative weakness 36 is produced in the concave-convex portion 26 of the disk 14 by a circular shaped recess formed therein. That is, the area 36 is formed of a thickness less than the thickness of the remaining portions of the disk 14 thereby causing the compressive strength of the disk 14 at the area 36 to be less than the compressive strength of other portions of the disk. As a result, upon reversal a center failure mode is achieved, i.e., the disk 14 reverses itself from the center of the concave-convex portion 26 outwardly towards the periphery thereof. As shown in FIG. 3, once the disk reverses itself in a center failure mode, it uniformly tears along the lines of weakness formed by the scores 34 to achieve full opening.

Figure 4:
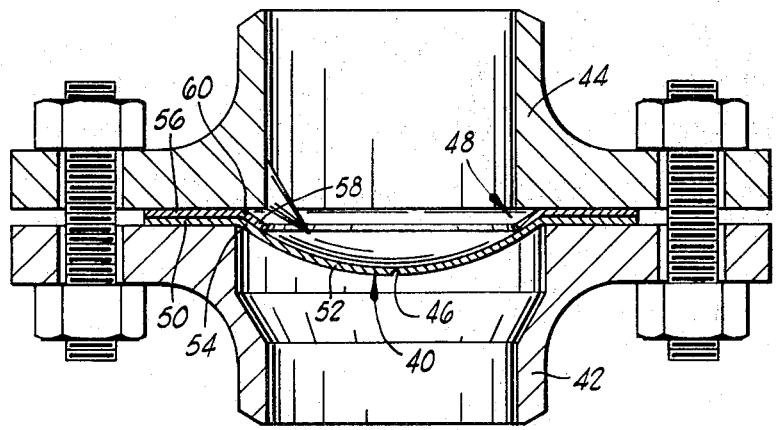
FIG. 4 is an elevational view of an alternate form of the safety pressure relief device of the present invention in cross section.

Referring now to FIG. 4, an alternate embodiment of the present invention is illustrated. In this form, a reverse buckling rupture disk 40 having scores 46 thereon is provided supported between inlet and outlet supporting members 42 and 44 respectively. The disk 40 is identical to the disk 14 previously described, except that the area of relative weakness 36 is not included. Instead, a support ring 48 is provided positioned between the rupture disk 40 and the outlet supporting member 44 so that the side portions of the disk 40 are supported and the center portion of the disk 40 is unsupported. More specifically, the rupture disk 40 includes an annular flat flange portion 50 connected to a concave-convex portion 52 by a transition connection 54. The support ring 48 includes an annular flat portion 56 connected to a truncated concave-convex portion 58 by a transition connection 60. As shown in FIG. 4, the support ring 48 is positioned in superimposed relation to the rupture disk 40 to provide support to the side portions thereof and insure a center failure mode upon reversal. That is, when the fluid pressure exerted on the convex side of the rupture disk 40 exceeds the design rupture pressure thereof, because the unsupported center portion of the disk 40 is of less compressive strength than the supported portions, the disk 40 reverses itself from the center outwardly. Upon reversal, the rupture disk 40 tears along the lines of weakness created by the scores 46 to achieve full opening without fragmentation.

In addition to insuring a center failure mode, it has been found that when the scores formed in a reverse buckling rupture disk are of a character such that after reversal the tensile strength of the disk is as close to the compressive strength of the disk prior to reversal as possible, problems caused by the disk failing to open or only partially opening are substantially reduced. That is, when the scores are of a character such that the rupture disk is weakened to the extent that the force which causes the disk to reverse is also sufficient to cause the disk to tear along the lines of weakness created by the scores, the possibility of reversal without rupture is minimized. A reverse buckling disk is generally stronger in tension than in compression, and particularly in low pressure applications, reversal without rupture creates a dangerous condition in that a pressure substantially higher than design may ultimately be required to cause rupture of the disk.

In order to absolutely insure that in operation of the safety pressure relief device 10 reversal without rupture does not occur, a penetration point 66 is provided attached to the outlet supporting member 16 so that when the disk 14 reverses itself, penetration automatically occurs. The penetration point 66 is comprised of a pointed member positioned so that upon reversal of the rupture disk 14 a portion of the disk is penetrated. Thus, in the event of reversal without rupture, penetration is insured by the member 66 which brings about some pressure relief and a warning of an unsafe condition.

The present invention, therefore, is well adapted to carry out the objects and attain the ends and advantages mentioned as well as those inherent therein. While presently preferred embodiments of the invention are given for the purpose of disclosure, numerous changes in the details of construction and arrangement of parts can be made which will readily suggest themselves to those skilled in the art.

What is claimed is:

1. In a reverse buckling safety pressure relief device having a concave-convex disk supported between inlet and outlet supporting members with the convex side of said disk positioned facing the inlet supporting member, the improvement which comprises:

said disk having at least one score on a surface of the concave-convex portion thereof creating at least one line of weakness therein of a character such that upon failure of said disk, the concave-convex portion first reverses itself and then tears along said line of weakness without fragmentation; and said disk including an area formed at the center of said concave-convex portion thereof having a thickness less than the thickness of the remainder of said disk thereby providing an area of relative weakness positioned at the center of said disk so that the compressive strength of said disk at the center thereof is less than the compressive strength of the remainder of the disk and upon failure, the disk reverses itself from the center of the concave-convex portion outwardly towards the periphery thereof.

2. The safety pressure relief device of claim 1 wherein said score on said concave-convex portion of said disk extends from the center to near the periphery thereof.

3. The safety pressure relief device of claim 2 wherein said score is of a character such that the force which causes the disk to reverse is sufficient to cause said disk to tear along said line of weakness created by said score.

4. The safety pressure relief device of claim 1 wherein said area formed at the center of the concave-convex portion of said disk having a thickness less than the thickness of the remainder of said disk is circular.

5. The safety pressure relief device of claim 4 which is further characterized to include means attached to said outlet supporting member for penetrating said disk when said disk reverses.

6. In a reverse buckling safety pressure relief device having a concave-convex reverse buckling rupture disk supported between inlet and outlet supporting members, the improvement which comprises:

said disk having an annular flat flange portion connected to said concave-convex portion by a transition connection;

the concave-convex portion of said disk including at least one score on a surface thereof creating at least one line of weakness therein of a character such that upon failure of said disk the concave-convex portion first reverses itself and then tears along said line of weakness without fragmentation; and the concave-convex portion of said disk including a circular area formed in the center thereof having a thickness less than the thickness of the remainder of said disk so that the compressive strength of said disk at the center thereof is less than the compressive strength of the remainder of said disk and on failure, said disk reverses itself from the center of said concave-convex portion outwardly towards the periphery thereof.

7. The safety pressure relief device of claim 6 which is further characterized to include each of said supporting members having an annular flat portion to coact and support the annular flat flange portions of said disk.

8. The safety pressure relief device of claim 7 wherein the scores on the concave-convex portion of said disk intersect at the center and extend to near the periphery thereof.

9. The safety pressure relief device of claim 8 wherein the scores are of a character such that the force which causes the disk to reverse is sufficient to cause said disk to tear along the lines of weakness created by said scores.

* * * * *